Nov. 19, 1935. I. HOLSMAN 2,021,362
ADVERTISING SIGN
Filed Jan. 17, 1935 4 Sheets-Sheet 4

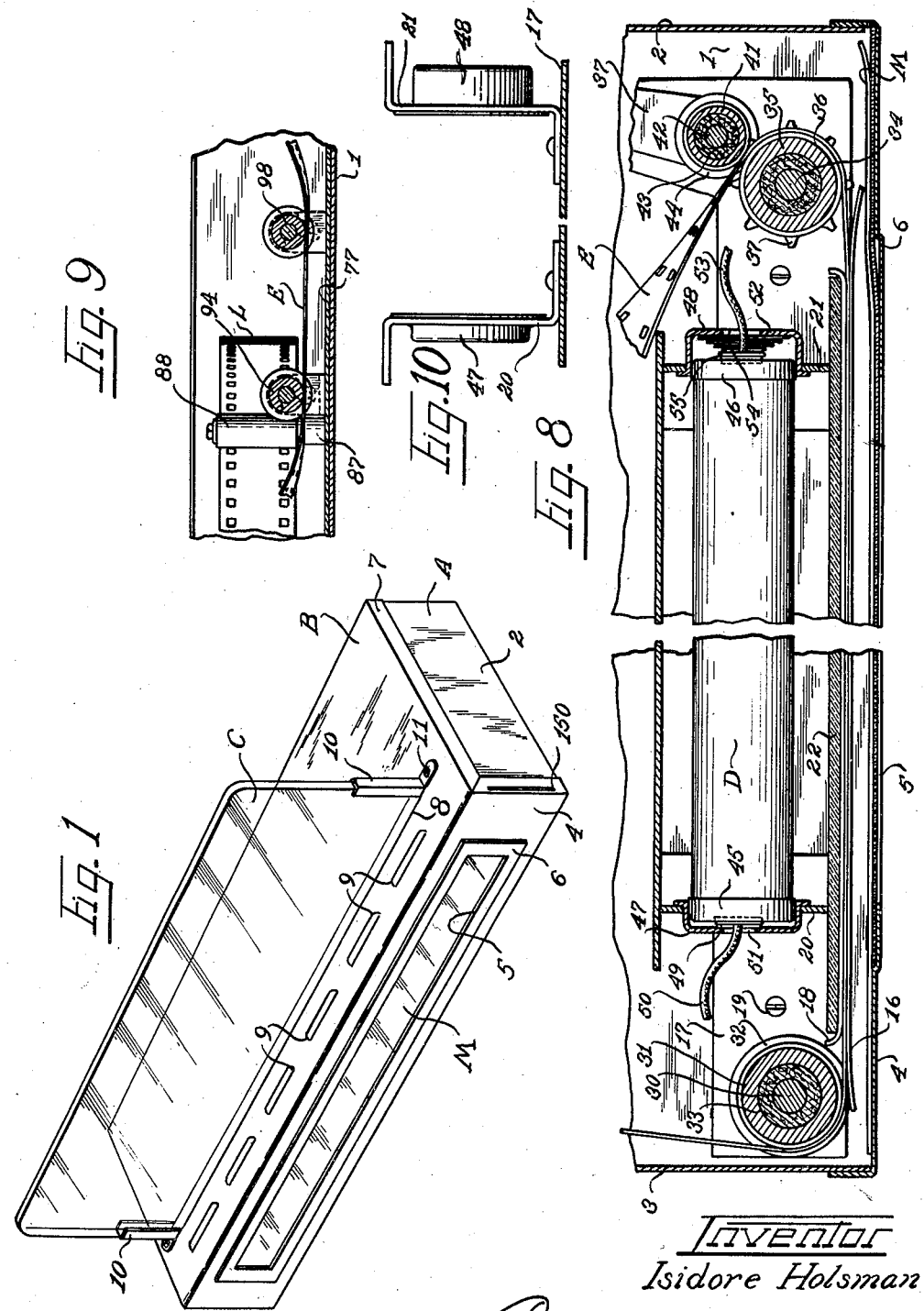

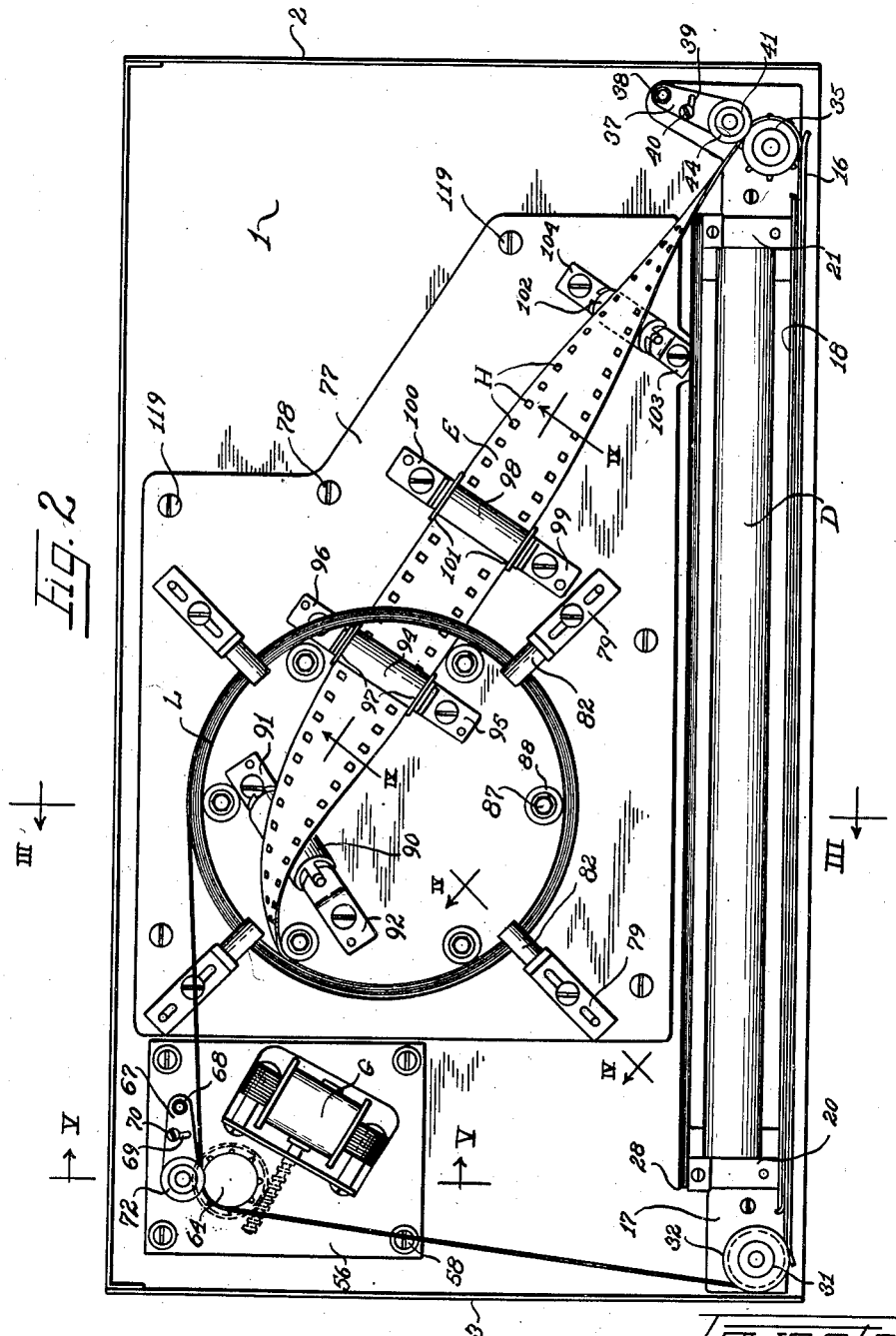

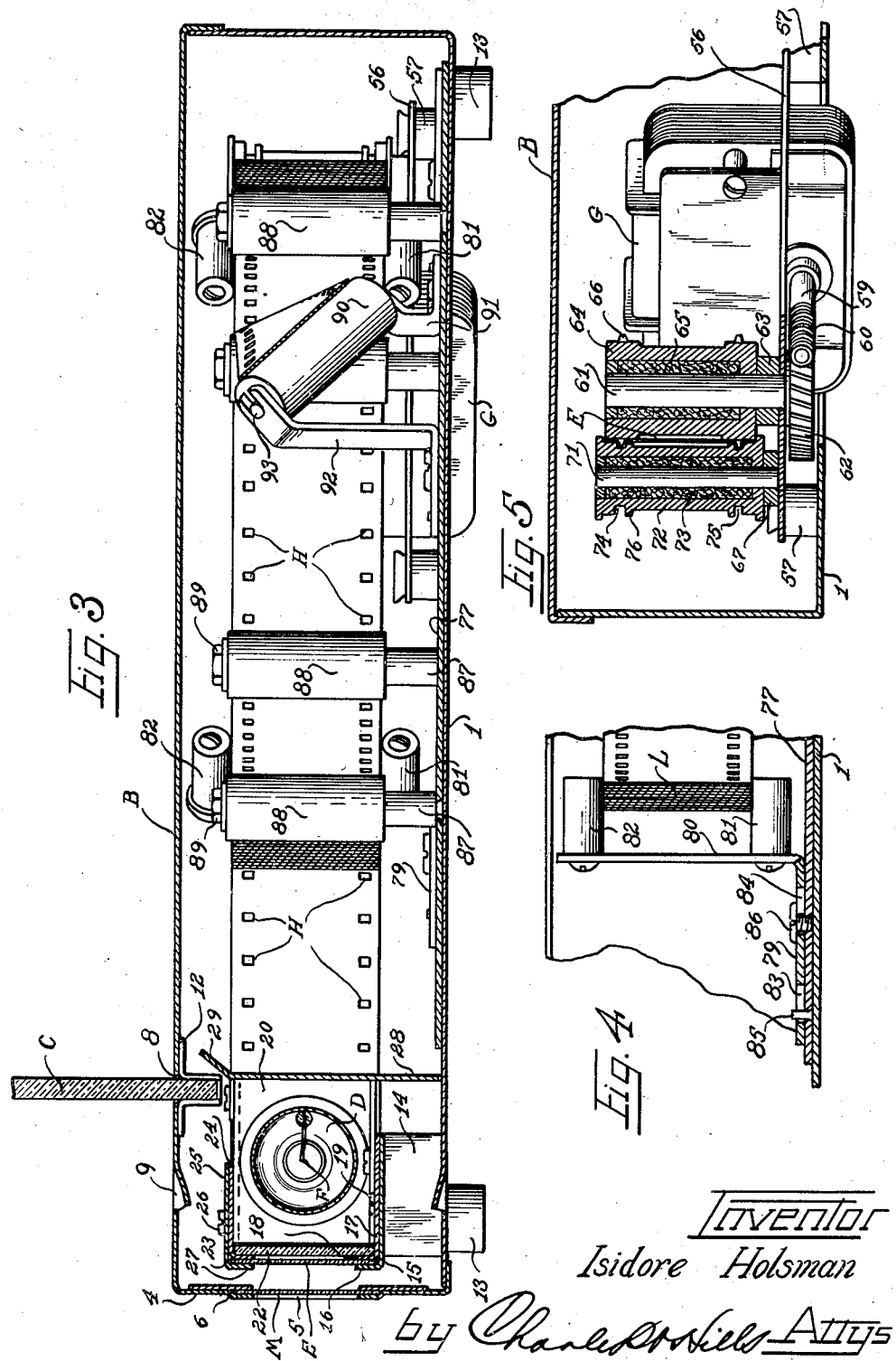

Inventor
Isidore Holsman
by Charles R. Wills, Attys

Patented Nov. 19, 1935

2,021,362

UNITED STATES PATENT OFFICE 2,021,362

ADVERTISING SIGN

Isidore Holsman, Chicago, Ill.

Application January 17, 1935, Serial No. 2,184

8 Claims. (Cl. 40—32)

The present invention relates to an advertising sign and more particularly to a readily portable apparatus comprising a box, containing an endless strip or film, and in which the film is continuously moved along an opening in a wall of the box and illuminated by a source of illumination contained within the box. The strip or film is equipped with suitable advertising matter or display matter which is photographically produced on the film so that the display matter observed is transparent, with the background of the film opaque.

The invention further contemplates the utilization of an endless film of many feet in length, a major portion of which film is arranged as a reel within the box and a minor portion of which is moved along the opening in the box, for advertising purposes.

The box of the present invention is a low one, just high enough to accommodate the film in edgewise position and also the various parts of mechanism employed in connection with the operation of the device.

An object of the present invention is to provide a readily portable advertising sign, of the illuminated type, wherein an endless film is employed, the major portion of which film is in the form of a reel within the box, together with means for moving the film continuously along an opening in a wall of the box, continuously unwinding the film from the reel and winding the film onto the reel.

Another object of the present invention is to provide, in a sign of the character mentioned, an endless film arranged within a casing with a portion of the film in the form of a reel supported in edgewise position within the casing, and unwinding a part of the film from the interior of the reel, turning the portion as unwound from the interior of the reel into substantially flatwise position to pass from the reel and then restoring the edgewise position of the film and moving it in edgewise position along an opening in the casing.

A further object of the present invention is to provide, in an advertising sign, an endless film carrying display matter, movable along an opening in the casing, which film is driven by a roller or sprocket, the roller or sprocket and the film being provided with cooperating interengaging means for positively moving the film by the roller.

A still further object of the present invention has to do with the provision of a continuous strip feed reel of film arranged so that the film may be continuously unwound from and wound onto said reel, and with the portion unwound from the reel turned into flatwise position to pass from the reel, together with means for returning the film to edgewise position for movement in edgewise position along an opening for display purposes.

Another and yet further object of the present invention is to provide an advertising sign in which an endless film is continuously moved along an opening in a casing, by means of a motor within the casing, which motor is constructed so as to occupy a space which is but slightly greater than the edgewise dimension of the film, and in which the various mechanisms employed for operating the sign are confined within a space but slightly more than the height of the guiding and driving means for the film.

The above other and further objects of the present invention will be apparent from the following description, accompanying drawings and appended claims:

Embodiments of the present invention are illustrated in the accompanying drawings and the views thereof are as follows:

Figure 1 is an isometric view of the casing of the present invention, showing an opening in a wall of the box and also showing an edgeglow plate supported in the cover of the box or casing.

Figure 2 is a top plan view of one form of the box or casing of the invention, with the cover removed, showing the film reel and the manner of passing the film in edgewise position along an opening in a side wall of the box and showing a lead of film turned to flatwise position and withdrawn below the reel.

Figure 3 is an enlarged vertical sectional view taken substantially in the plane indicated by line III—III of Figure 2.

Figure 4 is a fragmental vertical sectional view, with parts in elevation, of the illustrated form of means for supporting the film reel in position with the box.

Figure 5 is a fragmental vertical sectional view taken substantially in the plane indicated by line V—V of Figure 2.

Figure 8 is a fragmental horizontal sectional view through the casing and front wall showing details of construction, and showing the incandescent tube in plan.

Figure 9 is a fragmental vertical sectional view taken substantially in the plane indicated by line IX—IX of Figure 2, and Figure 10 is a side elevational view of the brackets for supporting the incandescent tube in position.

Figure 6:
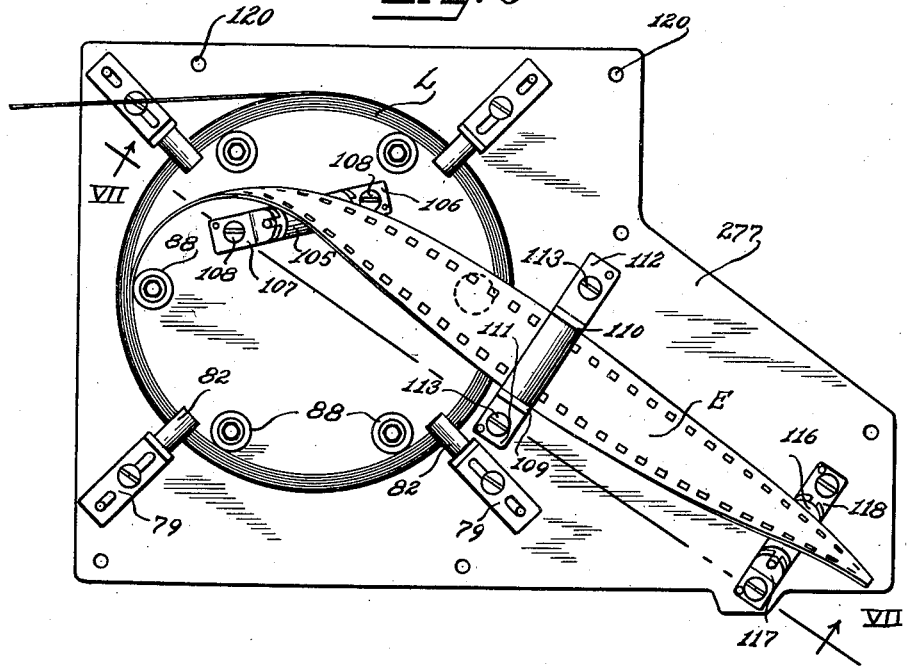
Figure 6 is a plan view of the reel or film and showing one means for withdrawing a lead of film from the interior of the reel and turning the drawn portion flatwise to pass across the upper margin of the reel.

The drawings will now be explained.

The box or casing of the present invention is one which is readily portable, and is illustrated as being of greater length than depth or height and in height is relatively low. The box or casing comprises a shell A and a cover or top B.

The shell A comprises a bottom 1, end walls 2 and 3. A front or side wall 4 may be formed as one of the walls of the shell A, or may be formed as is herein illustrated as a part of the cover or top B. The wall 4 is provided with an elongated opening 5 surrounding which is an offset part of the wall such as 6 formed by suitable pressing or drawing operations.

The cover B has flanges 7 adapted, when the cover is applied to the shell A, to fit over the walls of the shell for excluding the emission of light from the casing, except through the opening 5 and also through openings to be later described.

The cover B is provided with an elongated opening 8 parallel to the wall 4, and spaced inwardly therefrom a slight distance. In this opening is removably supported an edgeglow plate C of glass or other suitable transparent material which may be inscribed or impressed with suitable advertising or other indicia as desired. The top B is further provided with vents 9 for the escape of heat from within the casing.

The edgeglow plate C is shown as supported in position by upstanding guides 10, suitably secured to the top B. The guides 10 are shown as channel members adapted to receive the ends of the plate and are shown as attached to the cover B by means of screws 11.

Referring to Figure 3, it will be observed that the edgeglow plate C extends downwardly a slight distance below the top B where it is supported at its ends by suitable pockets 12 disposed near the extremities of the opening 8 through the top.

The bottom of the shell A is provided with feet 13, such as cylindrical pieces of rubber, or like composition, to suitably support the casing on a shelf, ledge or the like.

Supported on brackets 14 inwardly of and along the wall 4 of the casing is a plate 15 having one of its marginal edges upturned as at 16 forming a guide to be later described. The plate 15 extends substantially the full length of the interior of the casing, as may be observed in Fig. 8 and Fig. 2. Secured on top of the plate 15 is a second or similar plate 17 which in like manner to plate 15 has its corresponding edge upturned at 18, which upturned edge cooperates with the upturned marginal edge 16 of the plate 15 to provide a guideway for a film or strip to be later described. The plates 15 and 17 are secured to the brackets 14 by screws 19 or other similar attaching means.

Secured atop the plate 19 in spaced relation are brackets 20 and 21 for supporting therebetween an elongated incandescent electric light tube D. This tube D is thereby suported within the casing adjacent and parallel to the opening 5 through the wall 4 of the casing in inwardly spaced relation to such opening. The tube is inwardly spaced a sufficient distance to provide for the film rollers to be later described and at the same time present the film closely adjacent the opening 5.

Against the front margins of the brackets 20 and 21 a translucent plate 22 of glass or other suitable material is supported with its lower margin behind the upturned guide 18 of the plate 17 and its upper margin held in position against the lamp brackets by means of a downturned guide flange 23 forming part of a plate 24 attached to the upper margins of the brackets 20 and 21. A second plate 25 is secured atop the plate 24 and both these plates secured to the brackets by screws 26. The plate 25 is provided with a downturned flange 27 spaced from the flange 23 and cooperates therewith to serve as an upper guide for the upper margin of the film moved across and in front of the glass plate 22.

Attached against the rear margins of the lamp brackets 20 and 21 is an upstanding partition member 28 having its upper margin deflected, as at 29, away from the tube D.

The partition 28 is so disposed with regard to the edgeglow plate C that the edge of such plate which is within the casing, is disposed adjacent the inclined part 29 of the partition, thereby enabling the partition to serve as a reflector for directing light rays from the tube D against the exposed edge of the plate C for illuminating it.

Suitably attached to the plate 17 at one end thereof is an upstanding spindle 30 which receives the roller 31. The roller 31 has a cylindrical outer surface and with top and bottom flanges 32. Preferably the roller 31 is counterbored from its upper end so as to receive packing material 33 between it and the spindle 30 for lubricating the roller.

At the other end of the plate 19 a similar erect spindle 34 is secured and on this spindle is freely rotatably mounted a roller 35. This roller is also counterbored to receive a lubricating packing 36. This roller is provided on its exterior with a plurality of radially disposed teeth 37, arranged near the upper and lower ends of the roller for engaging apertures in the film.

Swingably supported on a plate 19 adjacent the roller 35 is an arm 37 pivoted at 38 to the plate 17. The arm 37 is provided with an arcuate slot 39 through which passes a screw 40 threaded into an opening in the plate 17 for securing the arm 37 in angularly adjusted position within its limit of adjustment. The free end of the arm 37 carries an idler roller 41 which is rotatable about a spindle 42 secured to the arm. This roller is counterbored to receive a lubricating packing 43. The idler roller 41 is provided with upper and lower guide flanges 44 guiding the top and bottom margins of the film E as it is moved through the casing as will be later described.

As will be observed from Figures 2 and 8, the rollers 31 and 35 are disposed adjacent the ends of the wall 4 of the casing and adjacent the opening 5 through such wall. The rollers 31 and 35 are so disposed that the film E, in its span between them, moves parallel to the glass plate 22, disposed in front of the light source D, and behind the opening 5 in the wall 4. The guides 16 and 18 cooperate to receive and guide the lower margin of the film as it is moved in edgewise position along the plate and opening while the upper margin of the film is guided by the flanges 23 and 27 of the plates 24 and 25 respectively. The film guides just described, support the film closely adjacent the glass plate 22 and yet spaced therefrom a slight distance to prevent rubbing of the film against the plate as the film is moved along the plate. The only portion of the film which is thus subjected to abrasion is that portion thereof within the guides which doesn't matter as far as the emulsion on the film is concerned.

The tub D has metallic caps 45 and 46 at its ends to which the filament F is attached.

The bracket 20 is provided with a cup shaped portion 47 adapted to receive one of the caps of the tube D while the bracket 21 is provided with a cup portion 48 greater in depth than the cup 47 of the bracket 20 to receive the opposite end of the tube. In order to place the tube D in electric circuit, a contact disc 49 is disposed within the cup 47 of the bracket 20 and is electrically connected to one end of a conductor 50 which enters the cup 47 through an aperture 51. The disc 49 is engageable flatwise by the cap 45 of the tube D.

Within the cup 48 of the bracket 21 is interposed a coil spring 52. A conductor 53 enters the cup 48 through an aperture 54 and extends through the spring 52 where it terminates in a contact disc 55 adapted to have flatwise contact with the cap 46 on the adjacent end of the tube D. The tube D is inserted in the bracket 20 and 21 by pushing the end thereof having the cap 46 thereon against the spring 52 to compress it to enable application of the other end of the tube in the cup 47 of the bracket 20. The tube is removed by pushing the same against the spring 52 to free one end thereof from the cup 47 of the bracket 20.

The conductors 50 and 53 are connected to a suitable switch conveniently disposed with respect to the casing so that the tube D may be illuminated as desired.

From Figure 8, it will be observed that the extremities of the guide 18 of the plate 19 are bent backwardly to prevent endwise displacement of the glass plate 22.

Directing attention to Figure 2, it will be observed that a motor base plate 56 is disposed in a rear corner of the casing adjacent the left hand end of the casing as observed in Figure 2. The plate 56 is supported above the bottom 1 of the casing by means of feet 57 of suitable insulating material, preferably cushion material such as rubber or rubber composition. The plate is secured to the bottom 1 of the casing by means of bolts 58 which preferably pass through the feet 57. The mounting, therefore, of the plate may be said to be a cushion or floating mounting for the motor. Suitably secured to the plate 56 is an appropriate motor designated generally as G and constructed so that its driving shaft 59 projects from the motor below the plate 56. This shaft is provided with a worm 60.

Mounted in the plate 56 so as to rotate therein is a vertically disposed shaft 61 having at its lower end a worm wheel 62 in mesh with the worm 60 of the motor shaft 59. The wormwheel 62 is between the plate 56 and the bottom 1 of the casing.

A drive sprocket 64 is supported in position by means of a bearing member 63 surrounding the shaft 61 and bearing against the top side of the plate 56. Keyed or otherwise secured to the spindle or shaft 61 is a driving roller 64, which is counterbored to receive a lubricating packing 65. This roller 64, like roller 35, is provided with a plurality of teeth 66 for engaging perforations in the film E to drive it.

Secured to the top side of the plate 56 is a swinging arm 67 pivoted to the plate at 68 and having an arcuate slot 69 in it through which projects a screw 70, threaded into the plate 56 for securing the arm 67 in angularly adjusted position. The swinging arm 67, at its free end, carries an upright spindle 71 on which is freely rotatable an idler roller 72. This roller is counterbored to receive a lubricating packing 73. The surface of the roller 72 is provided with upper and lower grooves 74 and 75 to receive therein the upper and lower teeth 66 of the driving roller 64. The grooves 74 and 75 are formed in the roller by means of annular flange elements 76 which constitute the bearing surface of the idler roller for engagement against the film E to hold it against the driving roller 64 so that the teeth 66 of the driving roller engage through the perforations H of the film.

Behind the partition 28 an irregularly shaped base plate 77 is secured to the bottom 1 of the casing by means of suitable screws 78. This base plate 77 supports the film reel L for rotative movement as later described.

Adjustably secured to the base plate 77 are a plurality of slide members 79 having upstanding portions 80 which support in vertical alignment and spacing, rollers 81 and 82, for receiving the lower and upper margins respectively of the reel L of the film, as may be readily observed in Figures 3 and 4. The slide members 79 are mounted on the base plate 77 for inward and outward adjustment with respect to the center of the film reel L. As illustrated, every one of the base members 79 is provided with two elongated slots 83 and 84, the slot 83 engaging a pin 85 set in the base plate 77 and upstanding therefrom while an adjusting screw 86 enters through a slot 84 and is in threaded engagement with the base plate 77. In this manner the slide members 79 may be moved inwardly or outwardly with respect to the film reel L to properly maintain such film in operative position in the casing.

The rollers 81 and 82 are carried on spindles secured to the upright portions 80 of the slide members and suitably fastened in place to prevent endwise dislodgement of the rollers.

In order to maintain the film reel L in substantially circular condition, a plurality of erect spindles 87 are secured to the base plate 77 and arranged uniformly about a central point defining in effect a regular polygon. There may be as many of these spindles 87 as conditions warrant, six of these being shown in the drawings. Everyone of the spindles 87 is provided with a vertically disposed roller 88 to bear against the interior of the film reel L and maintain the reel in substantially circular condition. The rollers 88 are secured to the spindles 87 by means of bolts 89 threaded into the upper ends of the spindles and properly engaging the rollers.

It will be observed, therefore, that the film reel L is retained and maintained in operative position, in edgewise relation, to the base plate 77, by means of the slide members 79 and their rollers and also by the rollers 88 on the spindles 87. The planes of the edges of the reel are parallel to the base plate 77 and therefore parallel to the bottom 1 of the casing. The reel 1, therefore, is supported in edgewise relationship with respect to the bottom of the casing and the portion of the film drawn from the reel and moved in front of the glass plate 22 and the light source D, maintained in edgewise position during such movement.

However, in view of the low box, it is necessary in drawing off the film from the interior of the reel L, to move the film from edgewise to flatwise position and then to restore it to edgewise position for movement in edgewise position in front of the light source D.

Figure 7:
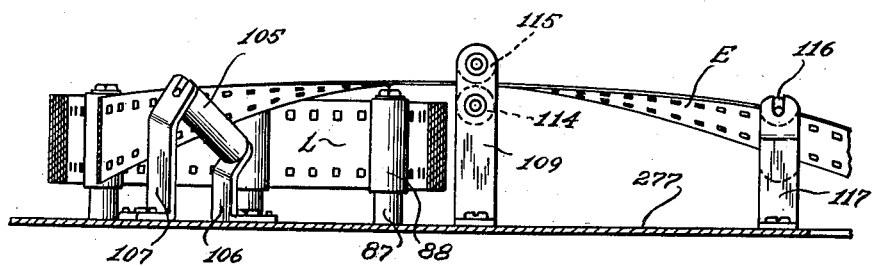
Figure 7 is a sectional view taken substantially in the plane indicated by line VII—VII of Figure 6.

Figure 2 illustrates suitable mechanism for turning the film from edgewise to flatwise position and withdrawing it from the interior of the reel underneath the reel, while Figures 6 and 7 illustrate mechanism for turning the film from edgewise position to flatwise position and withdrawing from the interior of the reel over the reel.

The mechanism for withdrawing the film from underneath the reel will now be described.

Mounted on the base plate 77 within the reel L is an inclined roller 90 supported by brackets 91 and 92. The bracket 91 supports the lower end of the roller while the bracket 92 supports the upper end of the roller. Brackets 91 and 92 have notches into which the roller axle 93 is inserted and retained for operation of the roller.

Also mounted on the base plate 77 within the confines of the reel L is a second roller 94 substantially parallel to the base plate 77 and supported on the base plate by end brackets 95 and 96. The roller 94 is so disposed with relation to the lower margin of the reel L that the film engaging the underside of the roller will freely pass underneath the reel L as may be observed in Fig. 6. The roller 94 is provided with end flanges 97 for guiding the film underneath the reel. Attached to the base plate 77 outwardly of the film reel L is another roller 98 supported by means of brackets 99 and 100. The film engages underneath this roller as may be observed in Figures 2 and 6. This roller is likewise provided with end flanges 101 for guiding the film in its movement. Secured to the base plate 77 adjacent the roller 95 is another inclined roller 102, supported by brackets 103 and 104 on the base plate. This roller is inclined in a direction to turn the film from the flatwise position it occupies in passing underneath the rollers 94 and 98 to edgewise position for movement in front of the light source D.

It will be observed from Figure 2 how the film is unwound from the interior of the film reel L, twisted into substantially flatwise position to move underneath the reel L and then restored to edgewise position for movement in front of the light source D and along the opening 5 in the side wall 4 of the casing. The film is wound onto the reel L after leaving the driving roller 64 as may be observed in Fig. 2.

The film is the usual endless type of celluloid film such as is employed in moving pictures and which film possesses inherent characteristics of flexibility and rigidity. As the film is withdrawn from the interior of the reel L by actuation of the driving roll 64, the film reel is rotated in clockwise direction as observed in Fig. 2.

The manner of withdrawing the film from the interior of the reel L over the margin of the reel will now be described:

Referring to Figures 6 and 7 of the drawings, a base plate 277 which is a counter part of the base plate 77 supports the reel L by means of the slide members 79 and rollers 81 and 82, and also the rollers 88 on the spindles 87.

Disposed on the base plate 277 within the confines of the reel L, is an inclined roller 105 carried on brackets 106 and 107 fastened to the base plate 277 by means of screws 108. The bracket 106 supports the lower end of the roller while the bracket 107 supports the higher end.

Secured to the base plate 277 just outside of the reel L are uprights 109 and 110 fastened by feet 111 and 112 respectively to the base plate by means of screws 113.

The uprights 109 and 110 support two closely adjacent parallel rollers 114 and 115 which are arranged in vertical relation and with their axes substantially parallel to the base plate 277. One of these rollers 114, engages the under side of the film as it passes over the reel L while the other roller 115 engages the upper side or surface of the film. The rollers 114 and 115 cooperate with the roller 105 to twist the film from edgewise position it occupies while in the reel L to substantially horizontal position to move it from the reel over the top margin of the reel.

An inclined roller 116 is supported on the base plate 277 by brackets 117 and 118, the bracket 117 supporting the higher end of the roller, and the bracket 118 the lower end. This roller is inclined to the plane of the base plate for aiding in returning the substantially flatwise portion of the film to edgewise position for the reasons heretofore described with reference to the arrangement shown in Fig. 2.

It will be observed that provision has been made for employing an endless film, the major portion of the length of which is normally in the form of a reel and unwinding the film from the interior of the reel and winding the film on the exterior of the reel. The film, as unwound from the interior of the reel is moved into substantially flatwise position for escaping from the reel, and then returned to edgewise position for use.

It is necessary to turn the film into substantially flatwise position in escaping from the reel because of the low height of the box.

The box or casing is maintained and made low so as to be readily carried and at the same time because of its dimensions, pleasing in appearance.

The base plates 77 and 277 are interchangeable, made possible by reason of the fact that these plates are secured in position within the casing by means of screws 119 passing through screw holes 120 in the base plates and engaging suitably threaded apertures in the bottom 1 of the casing.

The motor and light source D may be in series so as to be in circuit at the same time or else may be controlled separately so that if desired the light source D might be put in circuit for illuminating a portion of the film in front of the opening 5 without driving the motor. This, however, is an exceptional circumstance in the operation of the device in the present invention as it is contemplated to drive the film continuously and at the same time supply current to the light source D for illuminating the portion of the film being moved along the opening 5 in the wall 4 of the casing.

The capacity of the casing is such that the film reel L may include many turns or a few turns depending on the length of the film being used. It is possible with a device of the present invention and manufactured in readily portable form to accommodate a film of as many as several hundred feet in length, the provision of the reel of film enabling the use of a long film within a restricted casing.

The invention contemplates the continuous movement of the film along the opening 5 in the side wall 4 of the device so that the advertising or display matter appearing on the film travels continuously.

The advertising or display matter on the film is preferably photographed, the film being a photographic film and may consist of letters, figures, designs or any other type of display matter which may be desired.

The length of the opening 5 is substantially the length of the incandescent tube D so that when the device is in operation the display matter along the opening 5 is uniformly illuminated without any dark spots, usually attendant on the use of a plurality of illuminating units such as a plurality of electric light bulbs. The length of the tube D is approximately 18 inches so that it is therefore possible to make a readily portable display sign of the character of the present invention with an opening of approximately 18 inches with the assurance with all of the display matter moved along said opening will be uniformly illuminated from end to end, thus enhancing the desirability of the apparatus.

The offset 6 of the side wall 4 serves as a guideway for a strip of colored material M such as celluloid or the like, which is insertable through a slot 150 in the wall 4. Such colored strip greatly enhances the appearance of the display matter on the film E or the film is moved along the opening 5 in the wall 4. There may be strips of different colors interchangeable, so as to secure any desired color effect of the display matter on the film. If desired, a single colored strip might be replaced by two short strips of different colors.

The tube brackets 20 and 21 are preferably two piece, with the cups thereof of thinner material than the balance to facilitate drawing of the cups from flat stock.

The invention has been described herein more or less precisely as to details yet it is to be understood that the invention is not to be limited thereby, as changes may be made in the arrangement and proportion of parts, and equivalents may be substituted without departing from the spirit and scope of the invention.

I claim as my invention:

1. An illuminated sign apparatus including a low flat box having an opening along one side wall, an edgeglow plate supported in vertical position in the box top, a display strip movable along said opening, a single light source disposed to project light rays through said strip and opening and also against an edge of said plate to illuminate it, and means for moving said strip.

2. An illuminated sign apparatus including a low flat box having an opening along one side wall; the height of said box being but slightly more than the height of the film and less than twice the height of said film an endless film within said box having the major portion thereof in the form of a film reel, and adapted to be continuously moved along said opening; means supporting said reel for rotative movement; means for turning flatwise a portion of the film and guiding it flatwise away from the interior of said reel; means for drawing the film along said opening, the drawing of said film rotating said reel to unwind the film from the interior thereof and to wind the film about its exterior; a driven roller for moving said film in the manner stated, said driven roller and film having positive interengaging driving engagement; and a motor for actuating said driven roller.

3. In an illuminated sign of the type wherein an endless display strip is moved along an opening in a wall of a sign casing, of an endless strip of film of celluloid having a part thereof in the form of a film reel supported in edgewise vertical position within the casing, vertically disposed rollers disposed within the casing adjacent the ends of said opening, means supporting the top and bottom margins of the span of film between said rollers, a drive sprocket within said casing for drawing the film along said opening and moving it toward said reel, means for guiding the film as it is unwound from the interior of said reel and moved toward said first roller by drawing action effected by said drive sprocket, means for actuating said drive sprocket, and means for illuminating the portion of the film adjacent said opening.

4. In a device of the class described, a continuous film feed reel supported in edgewise vertical position for rotative movement and adapted to have film unwound from the interior thereof and wound about the exterior thereof, guide means engageable by the portions of film as unwound from the reel to change the position of such portions from edgewise to flatwise and to direct such flatwise portion out of said reel and then restore the edgewise position of the film.

5. An illuminated sign including a box having an elongated opening in one of its side walls; a single elongated incandescent electric light bulb disposed along and adjacent said opening and inwardly of said wall; a display film within said box adapted to be moved along said opening between it and said bulb; and an edgeglow plate supported in the box top with an edge adjacent and along said bulb; the length of said opening, bulb and plate being substantially co-extensive to avoid dark spots in the film and plate.

6. In a device of the class described, in combination, a base plate, a plurality of vertically disposed rotative spindles supported by said plate and arranged to receive a film reel in edgewise relation to the plate, means carried by said plate for supporting the top and bottom margins of said reel, a roller supported on said plate with its axis thereto inclined and disposed within the confines of the reel and adapted to have a part of the film unwound from the interior of the reel passing thereover, another roller supported on the plate within the confines of the reel with its axis in substantial parallelism with said plate and with the film passing therebelow, a third roller on said plate outside of said reel and having its axis parallel to the plate, said last mentioned roller receiving the film underneath it from said second roller, and a fourth roller on said plate next contacted by the film, said roller having its axis inclined to said plate in the same general direction as the first roller, and a vertically positioned roller for receiving the film from the fourth mentioned roller to return the film to edgewise relation with respect to the plate, said first roller being placed adjacent one of said spindles to prevent too abrupt change of direction of the portion of the film being unwound from the reel.

7. In a device of the class described, in combination, a base plate, a plurality of vertically disposed rotative rollers supported on said plate and arranged to receive a film reel in edgewise relation to the plate, means carried by said plate for supporting the top and bottom margins of said reel, a roller supported on said plate within the confines of the reel and having its axis inclined to said plate, vertically spaced horizontally two high disposed rollers supported on said plate outside of said reel adapted to receive the film from said first mentioned roller in substantially flatwise position, another roller supported on said plate with its axis inclined thereto to receive the film from said two high rollers, said last mentioned roller serving to turn the film from substantially horizontal position as it passes from the two high rollers to substantially edgewise position.

8. In a device of the class described, in combination, a base plate, a plurality of vertically disposed rotative rollers supported on said plate and arranged to receive a film reel in edgewise relation to the plate, means carried by said plate for supporting the top and bottom margins of said reel, rollers supported on said plate for receiving the film unwound from the interior of said reel and turning the film into substantially horizontal position and directing its withdrawal therefrom in horizontal position, and other means on said plate for returning said horizontal portion of the film to substantially edgewise position.

ISIDORE HOLSMAN.